INVENTORS
Jack M. Miller and
Clarence B Masoner.
BY Paul E. Mullendore
ATTORNEY

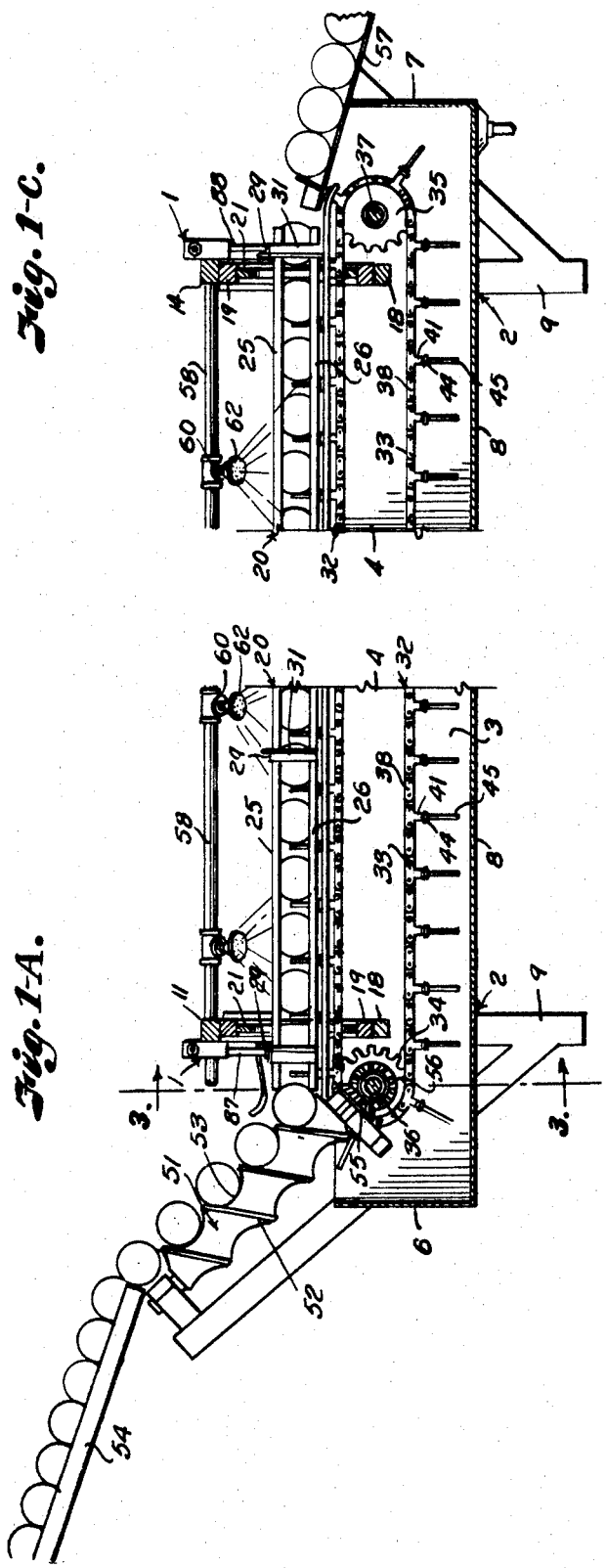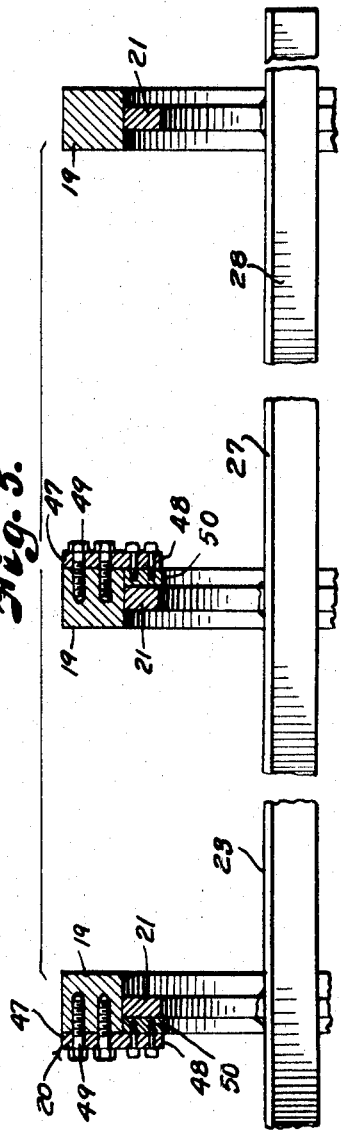

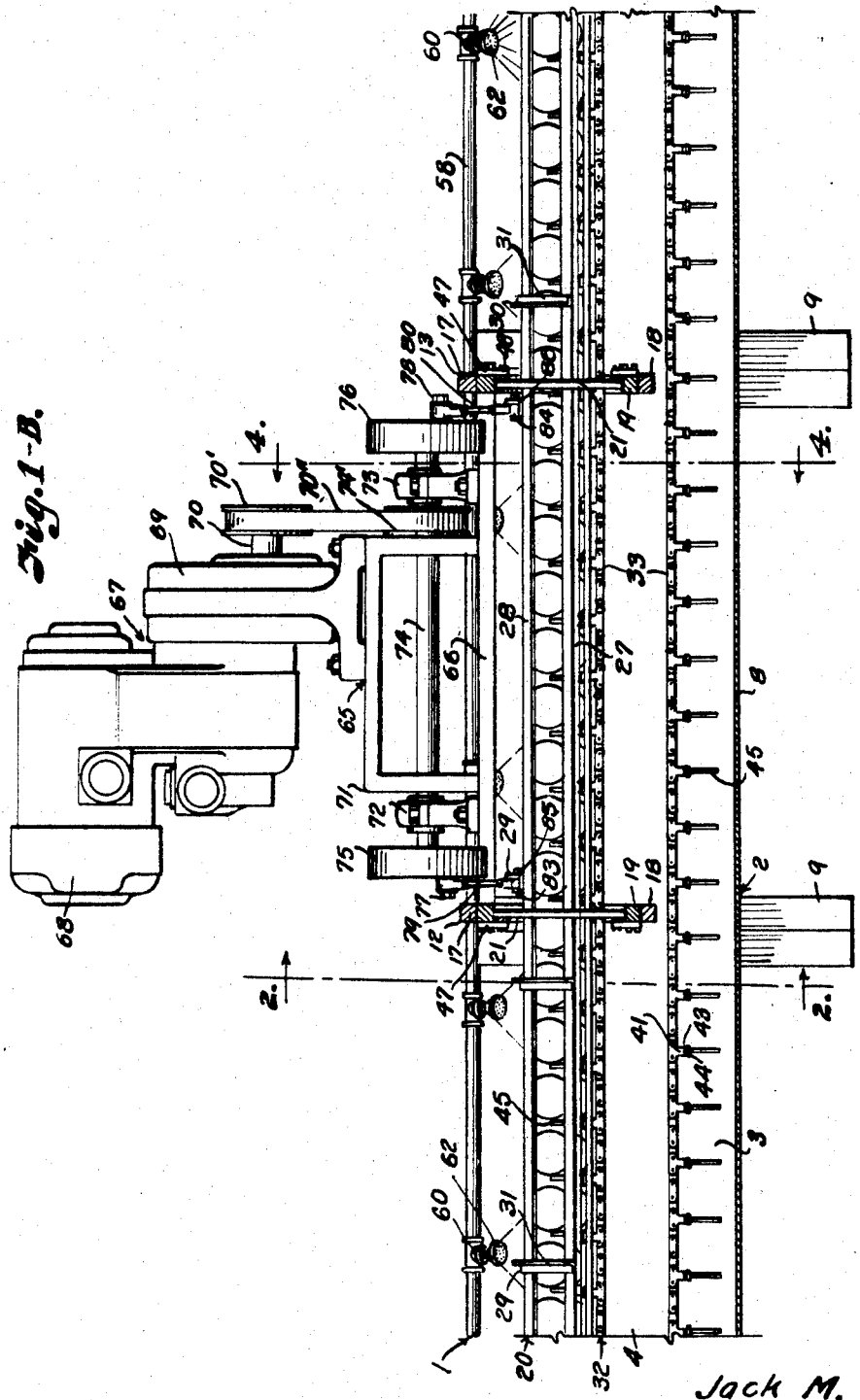

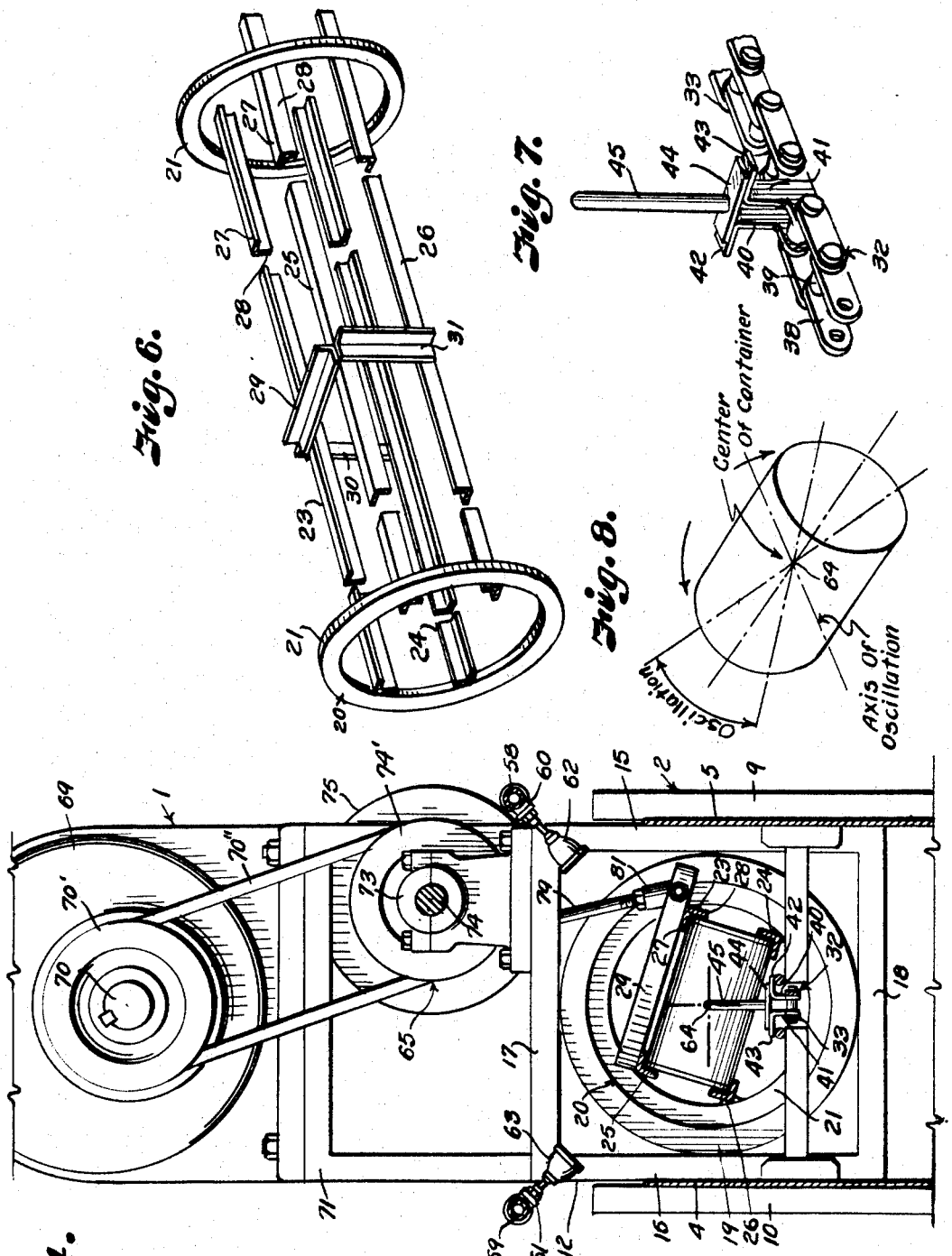

United States Patent Office 3,389,568
Patented June 25, 1968

3,389,568
METHOD AND APPARATUS FOR REMOVING PROCESSING HEAT FROM A FOOD PRODUCT IN FILLED AND CLOSED CONTAINERS
Jack M. Miller, Shawnee Mission, and Clarence B. Masoner, Lenexa, Kans., assignors, by mesne assignments, to Carnation Company, Los Angeles, Calif., a corporation of Delaware
Filed Feb. 14, 1966, Ser. No. 527,133
11 Claims. (Cl. 62—63)

ABSTRACT OF THE DISCLOSURE

This invention comprises an improved method of rapidly removing processing heat from a food product in filled and closed containers, and improved apparatus for accomplishing the same. In the method, the containers are rocked about the center of their longitudinal axis and a cooling medium is applied to their exterior while the containers travel along a linear path, the rocking being essentially zero at the entry point of the path and increasing progressively to a maximum at about the mid-point of the path and decreasing progressively to zero at the exit point of the path. This is accomplished by employing means which include a torsionally twistable container guide means held in registry at the entry and exit points of the path and oscillated by application of torsional oscillating force at about the mid-point thereof. Associated components are included in the apparatus. The net effect is continuously and progressively varying oscillation of each container along said path for automatic, yet efficient, heat transfer.

---

This invention relates to a method and apparatus for quickly and efficiently removing heat from food products in filled and closed containers. While the invention is intended for any food canning method in which the heat of processing must be removed, it is especially useful in cooling food products processed in accordance with high pressure-short time canning techniques.

In techniques of this character, the product is heated to a temperature level that is lethal to microorganisms and then filled while hot into containers. Preferably, the lethal temperature level is well above the normal atmospheric boiling point and within the range of about 230° to 270° F. To do this, the heating and filling steps are conducted under superatmospheric pressures. A practical pressure level which will enable maintenance of filling temperatures up to 255° F., is about 18 p.s.i.g., which pressure is tolerated by human personnel for long periods without ill effect. However, for human comfort the pressurized environment must be conditioned to a normal temperature of about 72° to 78° F. Consequently, the food product, upon being filled into containers at the environment temperature, will be immediately cooled by the containers and by outward radiation therefrom. This loss of heat in the product continues during filling, closing, cleaning of the closed container surface by washing or the like, and conveying therefore to the holding zone. Therefore, means is provided to restore such heat loss to a level which may be slightly in excess of the filling temperature by application of sufficient heat to the surfaces of the containers to assure complete sterilization of the containers and the product therein during a practical holding time, without damaging the product.

At the end of the holding period, the containers, and particularly containers of large size, have so much stored heat therein that it is difficult to remove the heat in time with the other steps of the process. this is because it is difficult to get rapid heat transmission from the innermost portions of the product to the side and end walls of the containers for heat exchange with an exterior cooling medium. Various attempts have been made to shake the containers mechanically to stir the product, but prior to the present invention they have not been successful in producing the necessary movement of the product in the containers.

It is, therefore, a principal object of the present invention to provide a novel method and apparatus for shaking each container by oscillation about its own center during its movement through the cooling zone, and thereby effect alternate movement of the product from the center of each container towards the ends thereof in constant changing contact with the side and ends thereof, and effect rapid heat transfer with the cooling medium.

This is accomplished in accordance with the present invention by providing a skeleton barrel through which the containers are conveyed, preferably in spaced apart relation, while the barrel is being rocked from side to side during application of the cooling medium. The barrel is so constructed that the containers are carried on their side, with their centers moving on the longitudinal rocking or oscillating axis of the barrel.

It is also an object of the invention to facilitate delivery and discharge of the containers into and out of the ends of the barrel while the mid-portion of the barrel is in rocking motion. This is provided for by means of a flexibly constructed barrel journally supported about its periphery to rock on its longitudinal axis, and by driving the barrel near its mid-portion while the ends thereof are resiliently held in registry with the feeding and discharge mechanisms for the containers.

Other objects of the invention are to provide an improved continuous conveyor means for advancing the containers in the barrel, and which does not interfere with operation of the barrel while the barrel is in motion; to provide a conveyor and barrel relation that avoids damage to the containers during shaking thereof; to provide driving means for the mid-portion of the barrel that modifies by inertia any fluctuations in speed caused by inertia of the containers as the barrel reverses its direction of movement, and thereby provide for relatively smooth operation and utilizing a minimum of power; and to provide for ready removal and replacement of barrels to accommodate various size containers, as when changing from a run of one size and/or shape of container to a run of another size and/or shape of container.

In accomplishing these and other objects of the invention as hereinafter pointed out, we have provided improved structure, the preferred form of which is illustrated in the accompanying drawings, wherein:

FIGS. 1–A, 1–B and 1–C are elevational views of the delivery end, discharge end, and midportion of a cooler constructed in accordance with the present invention, portions of the cooler between the respective figures being omitted to permit drawings on a larger scale.

FIG. 4 is a similar cross section on the line 4—4 of FIG. 1–B.

FIG. 5 is enlarged sections of the midportion and one end of the barrel, particularly illustrating rotational support thereof.

FIG. 6 is a perspective view encompassing the midportion and one end of the barrel, with the longitudinal members shown with portions broken away, to shorten the view.

FIG. 7 is a fragmentary, perspective view of a portion of the container conveyor, particularly illustrating one of the container driving pins and mounting thereof on the chain portion of the conveyor.

FIG. 8 is a diagrammatic view showing a container and the rocking motion thereof as the container is being conveyed through the rocking barrel of the cooler.

Figure 3:
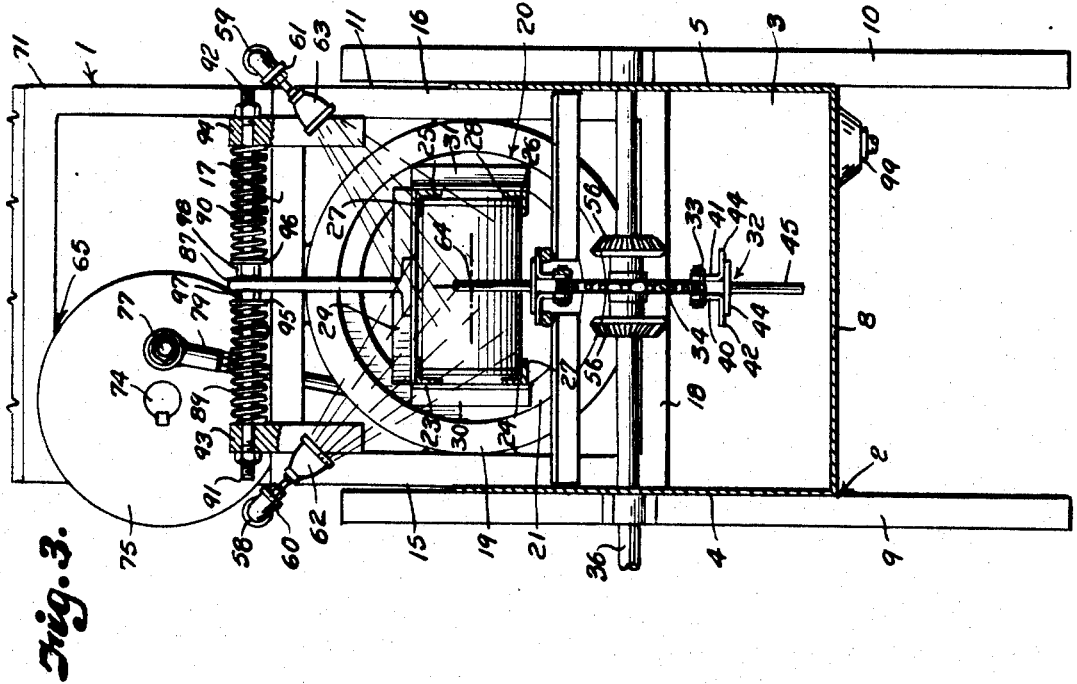
FIG. 3 is a similar cross section on the line 3—3 of FIG. 1–A.

Referring more in detail to the drawings:

1 designates an apparatus for removing processing heat from food produced in canning processes such as above described, after the processed food product has been filled into containers and the containers closed and held at sterilizing temperature to assure a product of long shelf life.

The apparatus includes an elongated main support 2 comprising a tank 3 having side walls 4 and 5, end walls 6 and 7, and a bottom 8 for catching a cooling medium sprayed onto the containers and dripping from the containers, as later described.

The tank 3 is supported along the length thereof by pairs of legs 9 and 10 that extend upwardly above the side walls 4 and 5 to support rectangular frames at least near the ends 6 and 7 of the tank and at the longitudinal midportion thereof, as indicated at 11, 12, 13 and 14. Each frame includes side members 15, 16 projecting above the legs 10 to carry a cross member 17. The lower ends of the side members 15 and 16 extend into the tank to be connected by a cross member 18. Fitting within and fixed to each of the frame members, preferably by welding, is a stationary ring 19 providing journals for a container guide means or barrel 20 that extends longitudinally of the main support 2.

Figure 2:
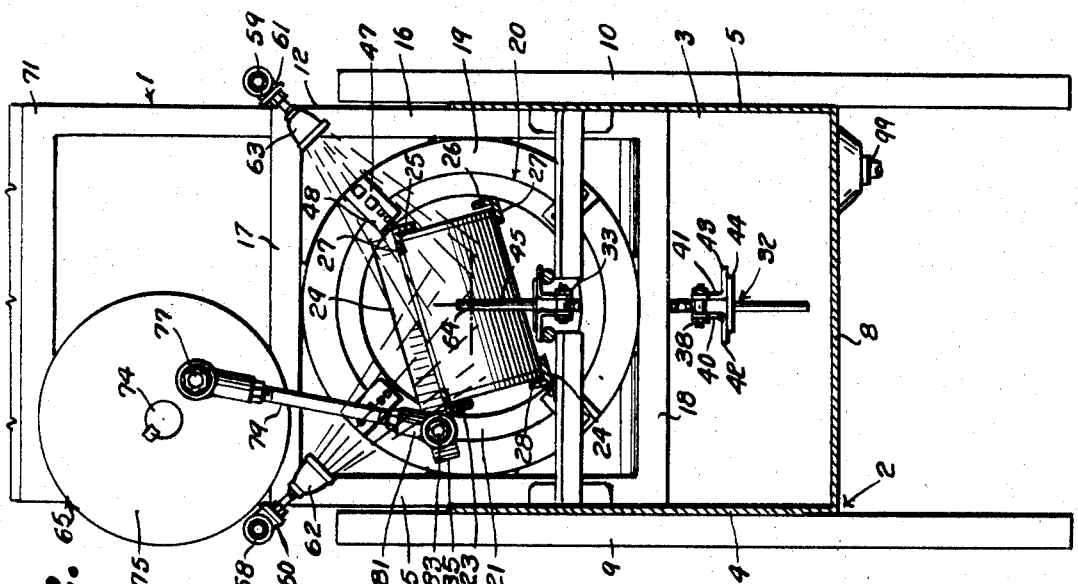
FIGURE 2 is an enlarged cross section on the line 2—2 of FIG. 1–B.

The container guide means or barrel 20 is of skeleton construction, as best illustrated in FIG. 6, and includes rings 21 for journal mounting in each of the stationary rings 19. Carried by the rings 21 on the inner peripheral edges 22 thereof are guides 23, 24, 25 and 26, each consisting of an elongated angle member having flanges 27 and 28. The guides 23 to 26 are arranged within each of the rings 21 with the flanges 27 and 28 extending on chords of a circle, with the guides being arranged so that the flanges 27 thereof are spaced apart corresponding to the diameter of the containers to be used in a run of product in the processing system, and the flanges 28 in position to closely engage the ends of the containers, as shown in FIGS. 2, 3 and 4. The flanges are relatively narrow for supporting the containers by sliding of the chimes thereon, and the flanges 28 provide stops for limiting endwise movement of the containers within the guides.

The upper of the guides, 23 and 25, are also connected at points intermediate the rings 21 by transverse members 29 fixed to the inturned flanges 27, preferably by welding. Also, the upper and lower guides are likewise connected by similar members 30 and 31 welded to the flanges 28 of the respective guides. The space between the lower guides 24 and 26 is open to accommodate a conveyor means 32 and over which the container guide is adapted to be oscillated, as later described.

The conveyor means 32 preferably consists of an elongated endless chain 33 operating over sprockets 34 and 35 in the respective ends of the tank, as shown in FIGS. 1–A, 1–C and 3, the sprockets being fixed to shafts 36 and 37 that are journally carried within the ends of the tank. The chain consists of links 38 (FIG. 7) connected by pins 39. Certain of the links may be of special design in that they are provided with lateral extensions 40 and 41 having substantially right angularly extending arms 42 and 43 which are connected on the outer surfaces thereof by cross plates 44 carrying a pin 45 of sufficient length to extend within the container guide means and into the path of the containers.

The upper run 46 extends through each ring 21 midway of and below the lower guides 24 and 26, as shown in FIGS. 2, 3 and 4, to engage the rear side of each container and push it along the guide flanges 27, and thereby hold the containers in spaced apart relation as the containers are advanced through the guide means, as later described.

In order to retain the guide means from longitudinal movement in the journal rings 19, the outer sides of the rings 19 that are carried by the midframes 12 and 13 are secured therein by support plates 47 having ends 48 overlapping the outer faces of the corresponding rings 21 (see FIGS. 1–B, 2 and 5). The plates are removably secured to the outer faces of the rings 19 by fastening devices, such as cap screws 49 (FIG. 5), whereby the barrel composing the guide means is adapted to be removed in an endwise direction and replaced with a similar barrel having guides arranged to accommodate containers when a run of different size and shape containers is desired. The ends 48 of the plates 47 are preferably faced with wear resistant shoes 50 which bear upon the peripheral side faces of the rings 19.

Connected with the end frame 11 is a means 51 for delivering containers having hot product into the adjacent end of the guide means, as shown in FIG. 1–A. The delivery means 51 may be of any type that is capable of timing containers into the spaces between the pins 47 of the conveyor means 32, and specifically forms no part of the present invention. In the illustrated instances, the delivery means has a pair of screw conveyors 52 that are provided with spiral grooves 53 to engage and support opposite ends of the containers therein as they are delivered from an upper track 54. The screw conveyors may be driven in any suitable manner in timed relation with the conveyor chain, for example, by bevel gears 55 having teeth meshing with bevel gears 56 on the shaft 36. The containers may be removed from the opposite end of the guide means 20 by any suitable manner, for example, they may be discharged onto an inclined conveyor 54 down which is the containers roll out of the cooling apparatus.

A cooling medium is discharged onto the surfaces of the containers as they are carried through the guide means 20. For example, the apparatus may include manifold conduits 58 and 59 extending along opposite sides of the main support and which are provided at suitably spaced points along the length thereof with lateral outlets 60 and 61 terminating in spray-heads 62 and 63 that are preferably adjustable to discharge the cooling medium in spray form upon the containers.

The conveying means is to aggitate the hot product in the container to bring the center portions thereof into constantly moving contact with the metal of the container, to give up its heat to the cooling medium.

In order to oscillate the conveying means and thereby rock the containers about the centers 64 thereof (FIGS. 2, 3, 4 and 8), is an actuating mechanism generally indicated at 65, as now to be described.

Carried by the frames 12 and 13 is a longitudinally disposed horizontal platform 66 (FIG. 1–B) for carrying a power unit 67 including a motor 68 driving a speed reduction mechanism 69 having a power delivery shaft 70, all of which is carried upon a supporting structure 71 supported on the platform 66. Carried on the platform near the ends thereof are bearing brackets 72 and 73 (FIGS. 1–B and 4), journaling a longitudinal shaker drive shaft 74 having its ends terminating short of the midframes 12 and 13. Fixed to the respective ends of the shaft are flywheels 75 and 76, each having a wrist pin 77 and 78 (FIGS. 1–B, 2 and 3) extending laterally therefrom in radial offset relation with the axis of the drive shaft 74 (FIGS. 2 and 3), for oscillating the guide means of connecting rods 79 and 80 having ends 81 journaled on pins 83 and 84 projecting laterally from arms 85 and 86. The arms 85 and 86 may comprise one of the cross members 29 that connect the upper guides 23 and 25 and which have projecting ends to provide the arms 85 and 86, as shown in FIG. 2. The shaft 74 has a pulley 74′ fixed thereto in line with a pulley 70′ on the power shaft 70, and operating over the pulleys is a belt 70″ for transmitting the power of the motor 68 to the shaker shaft 74.

In order to facilitate easy entrance of the containers into and out of the guide means, the guide means is held substantially stationary at its ends, so that the guide means is fully oscillated in the midportion thereof (see FIG. 1-B) and oscillation tapers out to zero at the respective ends thereof, as is allowed by the flexibility of the skeleton frame thereof.

To accomplish this action, the ends of the guide means are resiliently held in registry with the container delivery means and with the container discharge means, respectively, as now to be described. The upper cross members 29 at the ends of the guide means have upstanding arms 87 and 88 which are engaged between coil springs 89 and 90, as best shown in FIG. 3. The springs 89 and 90 are carried on bolts 91 and 92 that are slidably supported in blocks 93 and 94 fixed to the end frames 11 and 14. The outer ends bear against the inner faces of the blocks, and the timer ends against washers 95 and 96 that are retained against heads 97 and 98 of the bolts. The springs thus urge the heads of the bolts against opposite sides of the arms 87 and 88 to resiliently hold the arms in one position and normally prevent oscillation of the ends of the guide means when the center of the guide means is oscillated to shake the contents of the containers, as shown in FIGS. 2, 3 and 4.

The cooling medium collected by the tank is discharged therefrom through a drain 99, FIG. 3.

The shaft 36 may constitute the driving shaft of the chain conveyor 32 and is suitably connected with a motor unit, not shown.

The containers may be of various types with the product sealed therein, however, the operation of the apparatus will be described in conjunction with ordinary cylindrical metal cans. The cans are delivered from the place of holding with the heat of processing the product remaining therein, and which, in time with the various steps, must be quickly dispersed through the walls of the cans.

Assuming that the cooling apparatus is constructed and assembled as above described, and that the container guide means is in oscillation, that the cooling medium, such as cold water, is being discharged from the spray heads 62, and that the conveyor is in motion to carry the cans through the can guide means, the cans are delivered by the conveyor 54 to the timing mechanism 51, which passes the cans one at a time into the spaces between the pins 45 of the endless conveyor. Since the inlet end of the guide means is held in relatively fixed relation by the springs 89 and 90, the cans will pass easily into the guide means. The pins 45 following each can will push the cans along the guides 23–25 and 24–26 in separately spaced relation, to subject all surfaces of the cans to the cooling spray discharged from the spray heads 62, for absorption of the heat from the product through the walls of the cans. The cooling medium will spread over the outer surfaces of the cans and drip therefrom into the tank 3, to carry away the heat therewith. The heated spray medium is collected in the tank and drains off to a place of disposal, or to recooling equipment, as may be desired.

The wrist pins 77 and 78 on the flywheels 75 and 76 are connected through the rods 79 and 80 near the center of the conveyor guide means 20, and the guide means is anchored at the ends between the springs 89 and 90. The cans will start their end-to-end rocking movement from zero degrees and gradually increase to the maximum rocking movement near the midway point, which is substantially 34°, and then gradually reduce to zero degrees at the discharge end. In this way, the heat in the product that is in contact with the walls of the can is first to leave, before the more violent shaking of the cans begins. Oscillation of the cans starts movement of the hot product in the centers of the cans toward the ends thereof, which replaces the initially cooled product from the walls of the cans toward the centers thereof. Thus there is produced a continuous movement of the product that brings about a rapid and efficient cooling of the product during the time it takes for the cans to traverse the length of the guide means. When the cans pass the point of greatest oscillation, the oscillation of the cans begins to reduce to zero degrees, when each can is in position to roll down the discharge conveyor 52.

The cooling rate may be readily controlled by the rate of movement through the guide means, and also by varying the speed of oscillation.

Attention is particularly called to the importance of oscillating the cans about their own centers. This action provides the most efficient movement of the product, to bring it quickly to a uniform temperature, and also provides a balanced oscillation. That is, the center of gravity of the filled cans is at all times in the center of oscillation of the guide means, thereby providing a smooth action and with less power.

The inertia of the flywheels is also important in smoothing out the reversal of movement of the load being carried through the guide means.

The apparatus is adapted to ready changeover to runs of containers of different size by removing the holding plates 48 and sliding out one barrel fitted for a certain size can and sliding in a barrel fitted to a different size can, after which the plates 48 are replaced. This is of importance, because it is essential that the guides of the barrel closely fit the cans that are being run, not only to avoid damage to the cans, but to assure a smooth and quiet operation.

What we claim and desire to secure by Letters Patent is:

1. A method of removing processing heat from a food product in filled and closed containers, including the steps of rocking the containers about an axis of oscillation perpendicular to their longitudinal axis, and applying a cooling medium to exteriors of the containers, during said rocking, said containers being advanced along a path in a linear direction, said rocking increasing progressively from zero degrees at one end of said path to a maximum about midway of said path and then decreasing progressively to zero degrees at the opposite end of said path.

2. A method of removing processing heat from a food product in filled and closed containers as described in claim 1, wherein the cooling medium is applied at spaced points along said path.

3. A method of removing processing heat from a food product in filled and closed containers as described in claim 1, wherein the maximum rocking movement is substantially 34°.

4. An apparatus for removing processing heat from a food product in filled and closed containers, including
   an elongated main support,
   means for applying a cooling medium along the main support,
   a torsionally twistable oscillatable container guide means extending longitudinally of the main support providing upper and lower guides on opposite sides of an axis of oscillation for supporting ends of the containers with centers of the containers substantially in said axis of oscillation,
   means for journaling the container guide means on the main support for oscillation about said axis and with the containers in contact with the cooling medium,
   means for delivering the filled and closed containers into one end of the container guide means,
   means extending along the container guide means for advancing the containers from said one end to the other end of the container guide means,
   actuating means connected with the container guide means for oscillating and torsionally twisting the said guide means for rocking the containers about the centers of their longitudinal axis to alternately shift the product in each container from the center towards the ends of the container to displace cooled product from inner surfaces of the container, means at said other end of the container guide means for removing the cooled containers, and means at opposite ends of the container guide means for resiliently holding the ends of the container guide means in registry with the container delivery and removing means for easy entrance and exit of the containers while the container guide means is torsionally twisted and oscillated.

5. An apparatus for removing processing heat from a food product in filled and closed containers, as described in claim 4,
wherein the actuating means is connected with the container guide means at about the midportion of the container guide means, whereby oscillation of the container guide means is substantially zero degrees at said ends and reaches a maximum at said connection of the actuating means.

6. An apparatus for removing processing heat from a food product in filled and closed containers as described in claim 4, wherein
the container guide means is of skelton construction in that the guides are angle members having flanges for supporting the containers by resting the chimes thereon and having flanges providing stops against which ends of the containers abut,
rings fixed to and encircling the angle members near ends and midportions thereof,
and wherein the journaling means are fixed to the main support and have openings, with the rings oscillatable in said openings.

7. An apparatus for removing processing heat from a food product in filled and closed containers as described in claim 6,
and means at ends of the container guide means for resiliently holding the ends of the container guide means in registry with the container delivery and removing means for easy entrance and exit of the containers,
means fixed to the journal means and lapping portions of the outermost sides of the rings at said midportion,
and wherein the actuating means is connected with the container guide means at said midportion, whereby oscillation of the container guide means is substantially zero degrees at said ends and reaches a maximum at said actuating means.

8. An apparatus for removing processing heat from a food product in filled and closed containers as described in claim 4,
in which the container advancing means is an endless chain operating over sprockets at the ends of said container guide means, and
pins on the chain for extending between containers for spacing the containers and moving the containers through said guide means.

9. An apparatus for removing processing heat from a food product in filled and closed containers as described in claim 6,
in which the container advancing means is an endless chain operating over sprockets at the ends of said container guide means, and
pins on the chain for extending between the containers to space the containers and move the containers through said guide means.

10. An apparatus for removing processing heat from a food product in filled and closed containers as described in claim 5, in which
the container advancing means in an endless chain operating over sprockets at the ends of said container guide means and having an upper run extending parallel and below the lower angle members,
rails carried by the main support and extending along the upper run of the chain,
cross members carried by selected links of the chain and riding upon the rails, and
pins on the cross members and extending upwardly between the containers for spacing the containers and moving the containers through said guide means.

11. An apparatus for removing processing heat from filled and closed containers as described in claim 8,
wherein the means for delivering the containers having hot product into the container guide means includes timing means adapted to cooperate with the container advancing means for delivering a container into the container guide means ahead of each pin.

References Cited
UNITED STATES PATENTS

| | | | |
|---|---|---|---|
| 2,597,223 | 5/1952 | Burgess | 62—63 |
| 2,677,248 | 5/1954 | Rexford | 62—63 |
| 3,092,125 | 6/1963 | Kinsey | 134—160 X |
| 3,283,523 | 11/1966 | Long | 62—63 |

EDWARD J. MICHAEL, *Primary Examiner.*